Dec. 12, 1950   D. H. ANNIN   2,534,158
COMPARTMENT TESTING APPARATUS
Filed Sept. 29, 1945   2 Sheets-Sheet 1
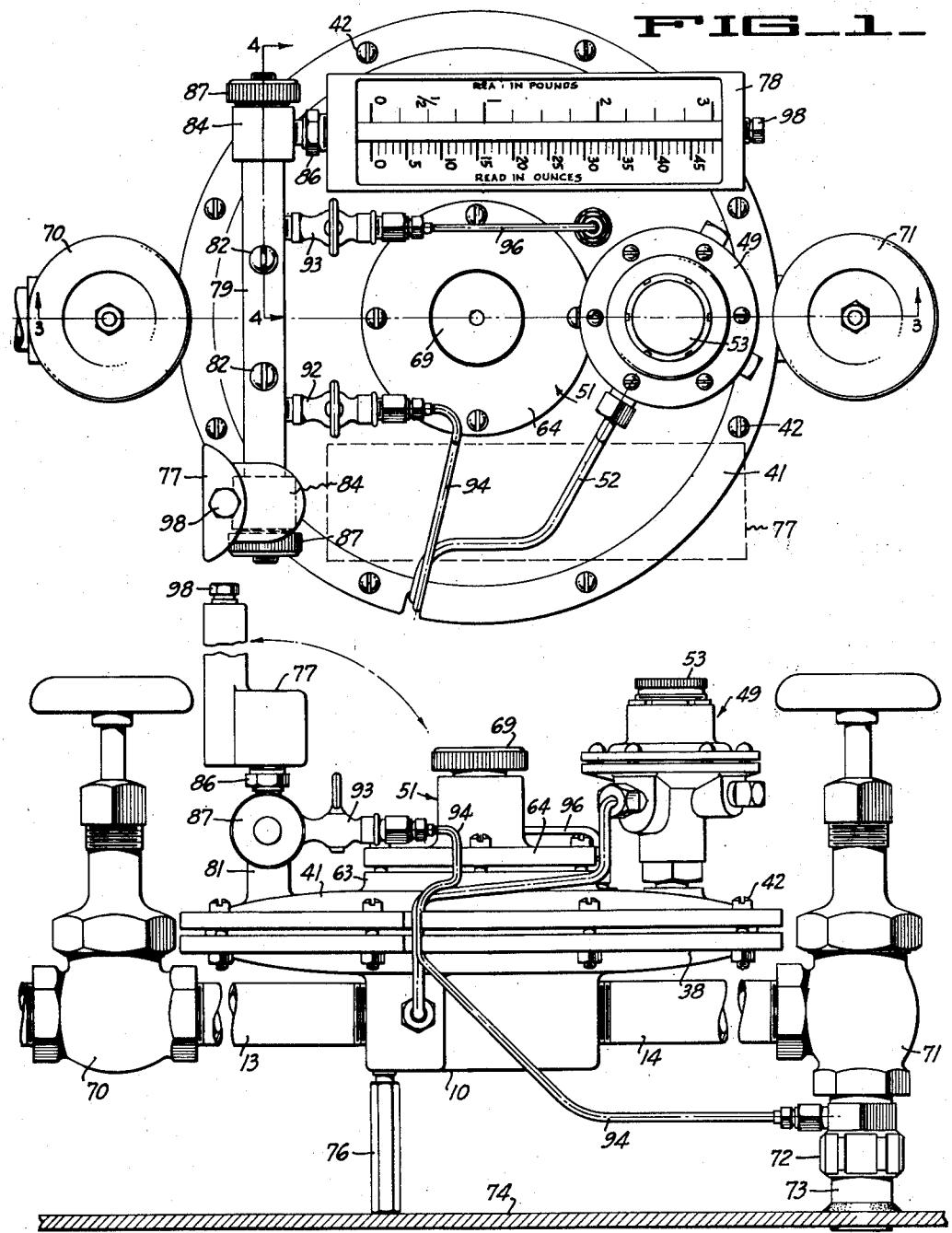
FIG_1_
FIG_2_
INVENTOR.
Douglas H. Annin
BY
Paul D. Flehr
ATTORNEY.

Dec. 12, 1950     D. H. ANNIN     2,534,158
COMPARTMENT TESTING APPARATUS
Filed Sept. 29, 1945     2 Sheets-Sheet 2
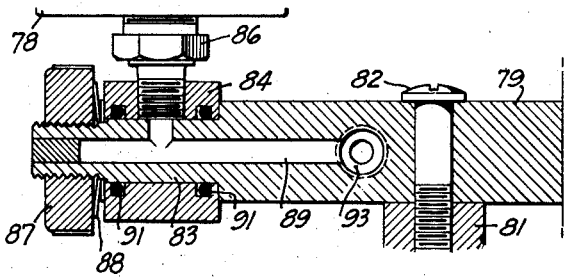
FIG_4_
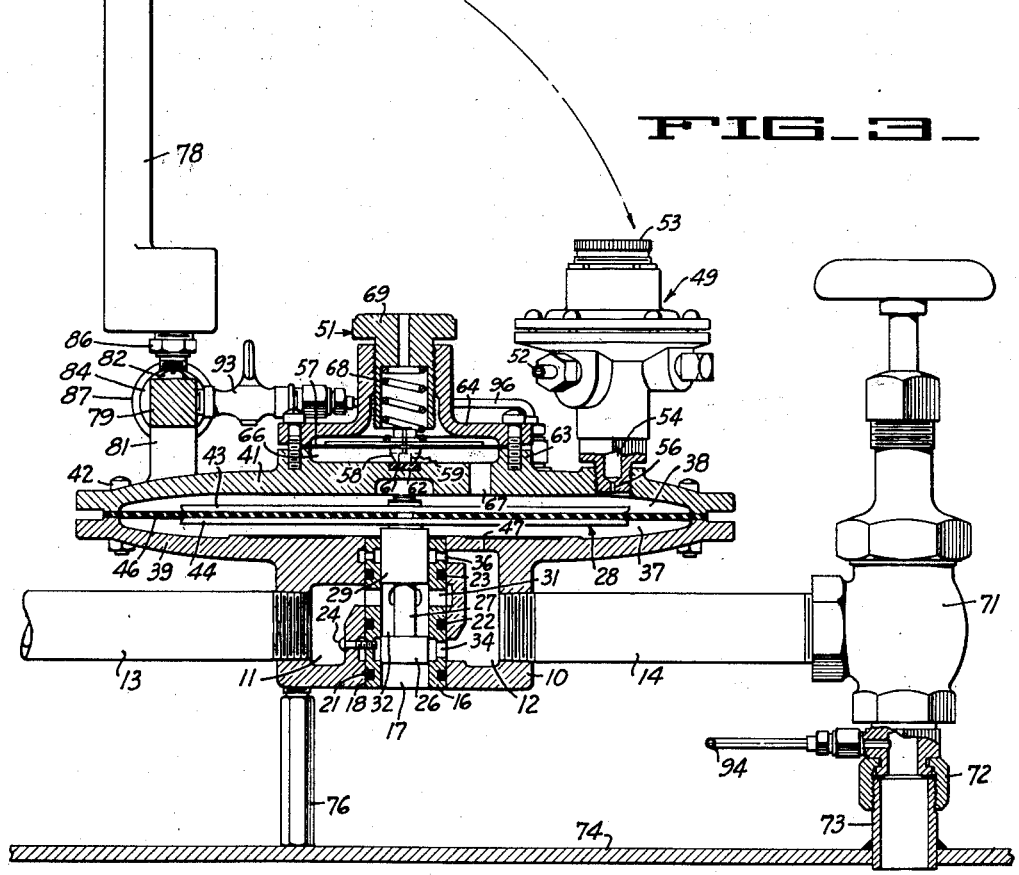
FIG_3_
INVENTOR.
Douglas H. Annin.
BY
Paul D. Flehr
ATTORNEY Patented Dec. 12, 1950

2,534,158

UNITED STATES PATENT OFFICE 2,534,158

COMPARTMENT TESTING APPARATUS

Douglas H. Annin, Oakland, Calif., assignor by mesne assignments, to Grove Regulator Company, a corporation of California Application September 29, 1945, Serial No. 619,294

3 Claims. (Cl. 73—40)

This invention relates generally to pneumatic equipment for the testing of tanks or compartments to detect the presence of possible leaks.

In the testing of tanks or compartmens for possible leaks it has been common practice to connect the tank to a source of air pressure until a prescribed pressure has been built up in the tank or compartment. The air inlet is then closed and the operator observes any possible drop in pressure over a given period of time. The extent of any leak present is indicated by the amount which the pressure drops in a prescribed period. Apparatus of this type has been used in the testing of ship compartments, but as previously constructed has been subject to certain inherent disadvantages. For example the apparatus has been somewhat difficult to operate and its use has been subject to the hazard of possible excessive pressure in the compartment. The walls of a ship compartment can be seriously damaged by application of too high a pressure. Prior testing apparatus has also been difficult to set for different prescribed compartment pressures, it has been difficult to provide a given pressure in the compartment to a high degree of accuracy, and it has been difficult to apply the apparatus to various compartment fittings, as for example to fittings extending from both horizontal and vertical walls.

In general it is an object of the present invention to improve upon prior types of tank testing equipment, and particularly to provide apparatus capable of overcoming the inherent disadvantages outlined above.

A further object of the invention is to provide compartment testing apparatus which greatly facilitates the work of the operator, which makes possible a high degree of accuracy with respect to the compartment pressures employed, and which will completely avoid the hazard of possible excessive pressure upon the compartment.

Additional objects of the invention will appear from the following description in which the preferred embodiment of the invention has been set forth in conjunction with the accompanying drawing.

Referring to the drawing—

Figure 1 is a plan view of the testing apparatus shown in Figure 2, and showing the pressure manometers in two permissible positions.

Figure 2 is a view of testing apparatus incorporating the present invention, illustrating how the same is applied to the horizontal wall of a compartment being tested, with the pressure indicating manometers in a vertical position.

Figure 3 is a side elevational view like Figure 2 but showing certain parts, particularly the main pressure reducing regulator, in section.

Figure 4 is a cross-sectional detail taken along the line 4—4 of Figure 1.

The apparatus illustrated in the drawing makes use of a special type of pressure reducing regulator. Briefly this regulator consists of a body 10 having passages 11 and 12 for communication with the inlet and discharge pipes 13 and 14. The valve means within this body consists of a sleeve 16 which is provided with a cylindrical bore 17, and which is fitted within a transverse bore 18 formed in the body. Spaced circumferential areas of the sleeve 16 are sealed with respect to the body by suitable means such as the O-rings 21, 22 and 23 of natural or synthetic rubber. The sleeve is retained in normal position by the screw 24, whereby upon removal of this screw the sleeve can be removed. A cylindrical plug-like valve member 26 is loosely fitted within bore 17 and is attached to stem or rod 27, which in turn is attached to the diaphragm assembly 28. Stem 27 also carries a cylindrical balancing member 29 which is likewise loosely fitted within bore 17.

The porting for the valve means described includes the ports 31 in sleeve 16, which communicate between inlet passage 11 and space 32 between valve member 26 and the balancing piston 29. Circumferentially spaced ports 34 in sleeve 16 communicate between outlet passage 12 and that region of the sleeve bore 17 occupied by valve member 26, when the diaphragm assembly 28 is in an intermediate position. A third set of circumferentially spaced ports 36 are provided about the balancing piston 29 and are likewise in communication with the outlet passage 12. The diaphragm assembly 28 is provided with suitable mounting means forming closed chambers 37 and 38 upon opposite sides of the same. This mounting means includes a flange 39 formed on the body and cooperating with the cover part 41. Bolts 42 serve to clamp the cover upon the body flange and to grip the peripheral margin of the diaphragm assembly.

The diaphragm assembly 28 can be of conventional construction consisting for example of the rigid diaphragm plates 43 and 44 clamped upon opposite sides of the flexible diaphragm element 46, the latter being formed of suitable flexible material such as natural or synthetic rubber. Space 37 on one side of this diaphragm communicates with the outlet passage 12 through the orifice 47.

A small capacity pressure reducing regulator 49 is provided for supplying a loading pressure to space 38, and this regulator is used in conjunction with a back pressure regulator 51. Regulator 49 can be of conventional construction and as illustrated provided with an inlet connection 52 for communicating with a source of air or other gas under pressure, together with a loading spring for its operating diaphragm which can be adjusted by turning member 53. The outlet passage 54 from this regulator communicates with space 38 through a flow restricting orifice 56.

Back pressure regulator 51 can consist of a diaphragm 57 carrying a valve member 58. Port 59 extending through valve member 58 communicates with the space above diaphragm 57 and thus to the atmosphere. The annular surface 61 on valve member 58 seals upon the disc-like insert 62, which is made of suitable yieldable material such as synthetic rubber. The peripheral edge portion of diaphragm 57 is clamped between the annular pad 63 on cover 41 and the upper cover or part 64 of the pressure reducing regulator. The closed chamber 66 thus forms upon one side of the diaphragm 57 and this space is in free communication with the space 38, through passage 67. Diaphragm 57 is loaded by compression spring 68, the pressure of which can be adjusted by turning the knob 69.

Pipe 13 is normally connected through hand valve 70 to the source of air being employed, which may be the surge tank of a compressor, or one or more pressure flasks or tanks. In a typical instance this source of pressure may be of a value ranging from say 80 to 125 p. s. i. Pipe 14 connects through hand valve 71 to a suitable manually operated valve 71, which in turn is provided with a suitable threaded coupling 72 for quick application to a short pipe section 73 mounted within one wall 74 of the compartment being tested. The wall in this case is horizontal but as will be presently explained it may be vertical in some instances. The body of the valve carries a pair of laterally spaced adjustable feet 76, adapted to engage the adjacent face of compartment wall 74 in order to steady the apparatus in proper position.

The cover plate 41 of the main regulator carries a pair of pressure gauges 77, 78 of the mercury manometer type. The special mounting for these manometers permits them to be swung through an angle of 90°, whereby they can be placed in proper vertical position for accurate reading for either horizontal or vertical position of the main regulator. The mounting illustrated employs a stationary bar or shaft 79 attached to the cover 41 by studs 81 and screws 82. Each end portion 83 (see Figure 4) is of reduced diameter and serves to swivelly support the collar 84, which in turn forms a mounting for the threaded fitting 86 of the corresponding manometer. An end nut 87 together with the spring or Belville washer 88 serves to retain the adjacent collar 84 in proper operating position. The ends of bar 79 are also provided with ducts 89 for communicating with the corresponding manometer irrespective of the position to which the manometer may be swung. Leakage from collars 84 is prevented by suitable means such as the rubber O-rings 91. The two ducts 89 connect with the small cocks 92, 93 whereby the tubes 94, 96 connected to these cocks can be placed in effective communication with the pressure chambers of the manometers 77, 78, respectively. Tube 94 (Figure 2) connects with the compartment side of the valve 71. Tube 96 connects with the loading chamber 38 of the main regulator and therefore manometer 78 indicates the pressure to which the main regulator is set. Cocks 92, 93 are preferably so constructed that when turned to closed positions the corresponding pressure chambers of the manometers are vented to the atmosphere. This facilitates a zero adjustment of the manometers, as by varying the setting of the adjusting screws 98.

Operation of the apparatus described above can now be outlined as follows: It will be presumed that the operator wishes to test a compartment by application of air pressure of a proper safe value such as 1 p. s. i. The apparatus described as a unitary piece of equipment is connected to the compartment by attachment of the coupling 72 with the pipe section 73. At this time the apparatus is connected to a source of air under pressure but with valves 70 and 71 closed. Assuming that the wall 74 is horizontal, manometers 77 and 78 are swung to a vertical position and at right angles to the plane of the main regulator diaphragm. However where wall 74 may be vertical the manometer is swung to a position in close proximity with the cover of the main regulator, or in other words substantially parallel to the plane of the main regulator. Petcocks 92, 93 are initially closed and the manometer is adjusted for accurate zero position. Both cocks 92, 93 are now opened, and now the operator sets the apparatus for a given pressure to be applied to the compartment. Thus assuming as previously mentioned that the pressure desired is 1 p. s. i., valve 70 is opened to supply air to the main regulator and knob 69 of the back pressure regulator is turned one way or the other until the pressure as indicated by manometer 78 is the value which is desired in the compartment. During this time manometer 77 registers zero because it is in communication with the compartment. The operator now opens valve 71 with the result that air is applied to the compartment being tested. Manometer 77 will now indicate a rising pressure in the compartment as the air is being supplied, until finally the pressure as read by manometer 77 will be the same as manometer 78. When this condition has been reached the operator closes valves 70 and 71 and then the pressure reading of manometer 77 is observed over a prescribed period of time, such as 30 minutes. The extent of the pressure drop if any indicates leakage from the compartment.

While operation of the main regulator has been described in my aforesaid copending application, a brief explanation is as follows: Assuming again that the regulated pressure to be delivered is 1 p. s. i., and the pressure source connected to pipe 13 is of the order of from 80 to 125 p. s. i., the small pressure reducing regulator 49 can be set to deliver a pressure of the order of 3 p. s. i. to its passage 54, with the consequent further reduction of pressure as air flows through the restricting orifice 56. Back pressure regulator 51, depending upon its setting, provides a loading pressure in space 38 which corresponds to that required in the compartment being tested and as indicated by the manometer 78. Normally there is continual venting of air from space 38 through the back pressure regulator. At the time the outlet pipe 14 of the main regulator is first connected through valve 71 with the compartment being tested, diaphragm assembly 23 moves under the urge of the loading in space 38 to translate valve member 26 to a position whereby ports 34 establish relatively free communication between space 32 and outlet passage 12. As a result air from the inlet pipe 13 is permitted to flow directly into the outlet pipe 14 and thus into the compartment. As the compartment pressure builds up to a value near the pressure level required, outlet pressure in space 34 flexes the diaphragm assembly upwardly with the result that there is a cutting off of communication between space 32 and outlet 12 with a consequent reduction in flow of air from the pipe 13. Due to the relatively loose fit between valve 26 and piston 29 with respect to bore 17, air from the inlet passage is also continually supplied to the outlet 12 past the periphery of piston 29 and through the ports 36. Likewise while pressure is being built up there is continual escape of air from the system past the valve member 26 and through the lower open end of the sleeve 16. The effective fluid pressure area of piston 29 balances out the fluid forces upon valve member 26, thereby enabling movements of the valve member with a minimum amount of effort.

When the desired pressure is reached in the compartment, valve member 26 assumes a position in which the total supply of air from inlet 11 past the valve member 26, through ports 34 and into the outlet 12, plus the air by-passing piston 29, is equaled by the amount of gas from the low pressure side which is continually escaping to the atmosphere past the valve member 26 and out the open end of sleeve 16. If a pressure should build up in the compartment above that desired, due for example to a sudden rise in temperature, increased pressure in chamber 37 causes valve member 26 to be moved whereby the venting of gas from outlet passage 12 past valve member 26 to the atmosphere exceeds the gas being supplied from the high pressure source, thus causing a loss of gas from the compartment with consequent drop in pressure.

A main regulator of the type described above is capable of a high degree of accuracy in the maintenance of a relatively low pressure such as that suitable for the testing of compartments. Furthermore it can be readily set to provide a pressure suitable for various compartments or tanks. It is also capable of supplying relatively large amounts of air or other gas to reach a desired pressure in a minimum amount of time.

I claim:

1. In a compartment tester, a pressure reducing regulator having inlet and outlet passages, means for coupling the outlet passage to the compartment to be tested, means for coupling the inlet passage to a source of air under pressure, a pressure indicating manometer, and means forming a swivel mounting for the manometer on the body of the regulator whereby the manometer can be placed in vertical operating position for either horizontal or vertical positioning of the regulator body, and means including said mounting for connecting the pressure chamber of said manometer to the compartment.

2. In a compartment tester, a pressure reducing regulator having inlet and outlet passages, means for coupling the outlet passage to the compartment to be tested, means for coupling the inlet passage to a source of air under pressure, a pair of pressure indicating manometers, means forming swivel mountings for the manometers on the body of the regulator whereby the manometers can be placed in vertical operating position for either horizontal or vertical positioning of the regulator body, and means including said mountings for connecting one of said manometers to the compartment being tested and for connecting the other manometer to the pressure reducing regulator to indicate the set pressure of the regulator.

3. In apparatus for pressure testing a compartment, a pressure reducing regulator having inlet and outlet passages, piping connected to the outlet of the pressure reducing regulator, coupling means carried by the piping for releasably coupling the piping to the compartment to be tested, a hand operated shut-off valve connected in the piping whereby the outlet of the regulator can either be placed in communication with or shut-off from communication with the compartment, piping for connecting the inlet passage of the regulator to a source of air under pressure, a pressure indicating gauge carried by the body of the regulator, and means forming a duct connecting the pressure indicating gauge with said piping at a point between said shut-off valve and said coupling means.

DOUGLAS H. ANNIN.

REFERENCES CITED

The following references are of record in the file of this patent:

UNITED STATES PATENTS

| Number | Name | Date |
| --- | --- | --- |
| 150,045 | Hogon | Apr. 21, 1874 |
| 1,134,352 | Schneider | Apr. 6, 1915 |
| 1,353,810 | Montgomery | Sept. 21, 1920 |
| 1,429,949 | Jacobs | Sept. 26, 1922 |
| 1,825,744 | Landrum | Oct. 6, 1931 |
| 1,883,522 | Breer | Oct. 18, 1932 |
| 1,887,578 | Bush | Nov. 15, 1932 |
| 2,098,677 | Saballus et al. | Nov. 9, 1937 |
| 2,196,279 | Thomas | Apr. 9, 1940 |